United States Patent [19]
Cerkanowicz

[11] 4,034,557
[45] July 12, 1977

[54] CONTROL OF THE INITIATION OF COMBUSTION AND CONTROL OF COMBUSTION

[75] Inventor: Anthony E. Cerkanowicz, Livingston, N.J.

[73] Assignee: Photochem Industries, Inc., Fairfield, N.J.

[21] Appl. No.: 680,870

[22] Filed: Apr. 27, 1976

Related U.S. Application Data

[62] Division of Ser. No. 468,543, May 9, 1974.

[51] Int. Cl.² .................................... F23H 5/26
[52] U.S. Cl. .................. 60/39.06; 60/39.82 R; 60/274; 431/6
[58] Field of Search ............ 431/1, 6, 2, 254; 60/39.82, 39.06, 274; 123/143; 250/432, 435, 436; 204/162

[56] References Cited

U.S. PATENT DOCUMENTS

| 3,122,887 | 3/1964 | Farmer | 60/39.82 |
| 3,560,363 | 2/1971 | Goetz | 204/162 R |
| 3,937,967 | 2/1976 | Steinitz | 250/435 |

Primary Examiner—Edward G. Favors
Attorney, Agent, or Firm—Cooper, Dunham, Clark, Griffin & Moran

[57] ABSTRACT

Method and apparatus for controlling the initiation and completion of self-sustaining combustion in fuel/oxidizer mixtures through the use of ultraviolet radiation absorbed throughout the mixture.

2 Claims, 14 Drawing Figures

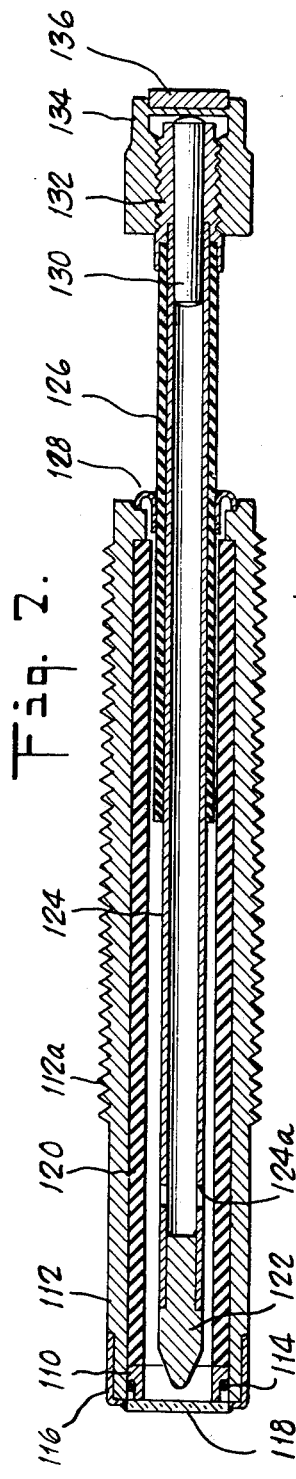
Fig. 2.
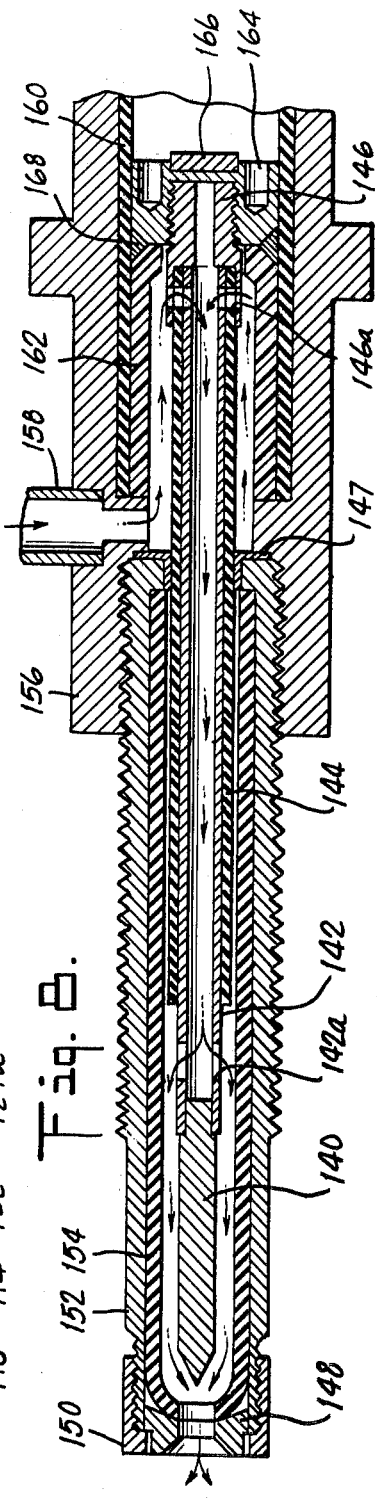
Fig. 8.
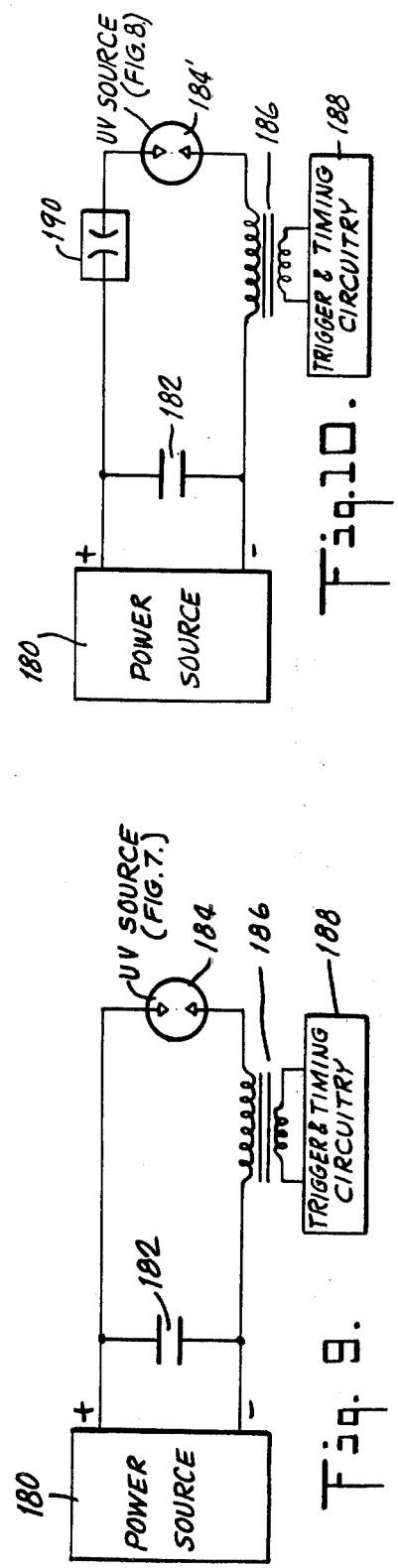
Fig. 10.
Fig. 9.

CONTROL OF THE INITIATION OF COMBUSTION AND CONTROL OF COMBUSTION

This is a division of application Ser. No. 468,543, filed May 9, 1974.

BACKGROUND AND BRIEF DESCRIPTION OF THE INVENTION

This invention relates to methods and apparatus for controlling the initiation and completion of combustion in combustible mixtures. The invention has particular application and is directed to the photochemical control of the initiation and completion of combustion, particularly in fuel/oxygen/diluent combustible mixtures.

Conventionally, combustible mixtures are ignited by raising the temperature of a zone within such a mixture to the thermal ignition point, so that ignition is initiated in the zone and is then propagated throughout the mixture. Thermal ignition temperatures of conventional mixtures are relatively high, and at such high temperatures pollutants are formed. Further, the creation of pollutants in the normal mixture range has been found to decrease with decreasing proportions of fuel in the mixture, so that fuel-lean mixtures generate less pollutants.

The present invention involves the appreciation that the irradiation of a combustible mixture with photon energy in the ultraviolet range preconditions the mixture by the photodissociative creation of a combustion intermediary species. For example, in the case of a fuel/oxygen mixture, additional oxygen atom concentrations are photochemically created far in excess of those existing at the temperature of the mixture. Such concentrations of combustion intermediary species in the mixture result in the effective lowering of the thermal ignition temperature of the mixing and also permit combustion with greatly reduced proportions of fuel and at greatly reduced pressures. Further, such ultraviolet irradiation has been found to effect the reaction front propagation velocity and decrease ignition delay. All of these factors enhance the combustion process and reduce pollutants generated.

Photochemical control of the combustion process is preferably to the conventional control by spark or other sources such as glow discharge, exploding wires, hot wire, and the like. In particular, initiation of the combustion process by these conventional devices does not readily offer a means for controlling the rate of combustion or flame progagation speed as does photochemical control.

In the present invention, the photodissociative creation of a combustion intermediary species may be in a concentration below that required for the photochemical initiation of combustion at the temperature of the mixture but above the concentration of the species that would exist at the thermal ignition temperature of the mixture. In this fashion, the mixture is preconditioned so that the thermal ignition temperature is significantly lowered and the mixture is closer to combustion. Following the preconditioning, combustion may be initiated by irradiating the mixture with a superimposed ultraviolet flash of suffcent intensity to initiate combustion therein. Alternatively and as another example, the preconditioning of the mixture may be followed by a superimposed electrical spark discharge therein or by some other heating method to initiate combustion.

The present invention also utilizes the irradiation of a combustion mixture from a plurality of sources of ultraviolet energy, thereby enhancing the photochemical combustion process. By the use of such plural sources, it has been found that different zones within a combustible mixture may be preconditioned and the combustion processes therein controlled to enhance the combustion process of the overall mixture.

The invention contemplates unique sources of ultraviolet energy in the form of spaced electrodes in an inert gas atmosphere. In one embodiment a window is employed to provide for the tranmission of ultraviolet energy from a sealed source, without appreciable absorption thereof, into a combustible mixture. In another embodiment, a "windowless" source is employed utilizing a flow of inert gas to dynamically create the necessary gaseous conditions between the electrodes, displacing foreign gas, and thus providing for efficient generation of the necessary ultraviolet radiation.

The present invention thus has application to all combustion processes, and in particular to those combustion processes involving oxygen, e.g., combustion processes in automotive and aircraft engines. The techniques may be employed in enhancing combustion in all combustion chambers, including exhaust systems of combustion devices.

The work to date in the investigation of photochemical control of the combustion process has largely been theoretical. Representative publications are as follows:

1. "Final Report - Photochemical Enhancement of Combustion and Mixing in Supersonic Flows", by A. E. Cerkanowicz, Photochem Industries, Inc., Fairfield, N.J., dated Nov. 1973, distributed on Apr. 1, 1974.
2. "Interim Scientific Report - Photochemical Enhancement of Combustion and Mixing in Supersonic Flows", by A. E. Cerkanowicz, Photochem Industries., Fairfield, N.J., dated March 1972, distributed May 16, 1973.
3. "Photochemical Ignition and Combustion Enhancement in High Speed Flows of Fuel-Air Mixtures", by A. E. Cerkanowicz and R. F. McAlevy III, Photochem Industries, Incorporated, Fairfield, New Jersey, published by American Institute of Aeronautics and Astronautics at AIAA 11TH AEROSPACE SCIENCES MEETING, WASHINGTON D.C./JANUARY 1-12, 1973, AIAA Paper No. 73-216.
4. "The Photochemical Ignition Mechanism of Unsensitized Fuel-Air Mixtures", By A. E. Cerkanowicz, M. E. Levy and R. F. McAlevy III, Photochem Industries, Fairfield, New Jersey, published by American Institute of Aeronautics and Astronautics at AIAA 8TH AEROSPACE SCIENCES MEETING, NEW YORK, NEW YORK/JANUARY 19-21, 1970, AIAA Paper No. 70-149.
5. "Argon Photoionization Cross-Sections and Autoionized Line Profiles in the 504–304 A Region", by M. E. Levy, Photochem Industries, Hoboken, N.J. 07030, and R. E. Huffman, Air Force Cambridge Research Laboratories, Bedford, Massachusetts 01731, published by Pergamon Press 1969 in J. QUANT, SPECTROSE, RADIAT, TRANSFER, Vol. 9, pp. 1349–1358, Printed in Great Britain.
6. "Igniton of Subatmospheric Gaseous Fuel-Oxidant Mixtures by Ultraviolet Irradiation", by M. E. Levy and A. E. Cerkanowicz, Vitro Laboratories, West Orange, New Jersey and R. F. McAlevy III, Stevens Institute of Technology, Hoboken, New Jersey, published by American Institute of Aeronautics and Astronautics at AIAA 7TH AEROSPACE SCIENCES MEETING, NEW YORK CITY, NEW YORK-/JANUARY 20–22, 1969, AIAA Paper No. 69–88.
7. "Photochemical Ignition of Low Pressure Fuel-Oxidizer Mixtures", by M. E. Levy and A. E. Cerkanowicz, Vitro Laboratories, West Orange, New Jersey and R. F. McAlevy III, Mechanical Engineering Department, Stevens Institute of Technology, Hoboken, New Jersey, paper delivered before fall meeting of the Western States Section of the Combustion Institute held at Stamford Research Center Institute, Palo Alto, California (Monday and Thuesday of third week of October 1968).
8. ROCKETS, October 1945, Page 10, (copy in class 60, subclass 39.82).

Representative patents are as follows:

| U.S. PATENT | ISSUE DATE | PATENTEE |
|---|---|---|
| 3,190,823-204/157 | June 22, 1965 | R. Bloxham |
| 3,177,651 | April 13, 1965 | H. R. Lawrence |
| 3,167,015-102/103 | Jan. 26, 1965 | B. Smith et al |
| 3,049,874 | Aug. 21, 1962 | M. R. Morrow et al |
| 3,122,887-60/39.82 | March 3, 1964 | B. J. Farmer |
| British Patent No. 850,321 published 5 October 1960. | | |

The invention will be more completely understood by reference to the following detailed description, which is to be read in conjunction with the appended drawings.

BRIEF DECRIPTION OF THE DRAWINGS

FIGS. 7 and 8 are sectional views of sources for generating ultraviolet radiation.

FIGS. 9 and 10 are typical circuit diagrams of electrical circuits used to energize sources of ultraviolet radiation.

DETAILED DESCRIPTION

Figure 1A:
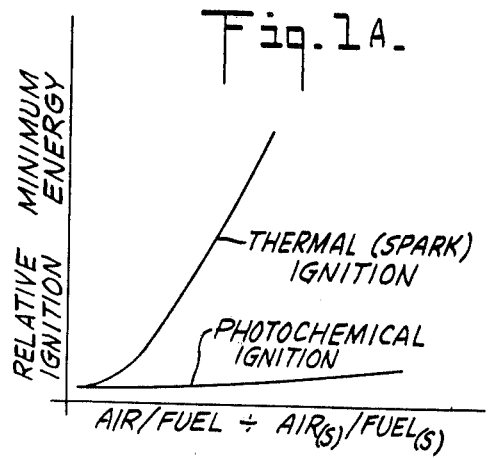
FIGS. 1A, 1B, 1C and 1D are curves useful in understanding the invention.

It first will be preferable to consider various aspects of photochemical ignition, in general. As noted above, the present invention is directed to the control of the initiation of self-sustaining combustion as well as the combustion rate and flame propagation velocity in a combustible mixture. This is achieved by irradiating the mixture with ultraviolet radiation. Typically, sensitization of the mixture is not required. Sensitizers are additives foreign to the combustible mixture of interest but which absorb some of the incident radiation. For example, in the case of sensitizing by $NO_2$, the primary photochemical reaction is:

$$NO_2 + h\nu \rightarrow NO + O.$$

In the case of mercury, the primary photochemical reaction is:

$$Hg + h\nu \rightarrow Hg^*$$

followed by $$Hg^* + O_2 \rightarrow Hg + 2O.$$

The mixture which is irradiated may or may not be intermixed fully or partially with a diluent; for example, in the case of fuel/air as the combustible mixture, nitrogen is typically present as a major diluent.

As noted above, the present invention involves the photodissociative creation of a combustion intermediary species by ultraviolet irradiaton of a combustible mixture. In particular, the density of the combustion intermediary species in various parts of the volume occupied by the mixture is controlled. For example, in the case of a fuel/oxygen mixture, oxygen molecules can be dissociated into two oxygen atoms when irradiated with ultraviolet radiation of the proper wavelength. The resulting photodissociation path and state of the product atoms are different in each of the following wavelength regions:

1. wavelength of photon below 923 A $$O_2(^3\Sigma_g^-) + \text{photon} \rightarrow 2O\,(^1S)$$

2. wavelength of photon 923–1342 A $$O_2(^3\Sigma_g^-) + \text{photon} \rightarrow O(^3P) + O(^1S)$$

3. wavelength of photon 1300–1750 A (Schumann-Runge Continuum)

$$O_2(^3\Sigma_g^-) + \text{photon} \rightarrow O(^1D) + O(^3P)$$

4. wavelength of photon 1750–2000 A (Schumann-Runge Bands)

$$O_2(^3\Sigma_g^-) + \text{photon} \rightarrow O_2(^3\Sigma_u^-) \rightarrow 2O(^3P)$$

5. wavelength of photon 2000–2424 A (Herzberg Bands )

$$O_2(^3\Sigma_g^-) + \text{photon} \rightarrow 2O(^3P)$$

The process of photochemical initiation of self-sustained combustion depends primarily on the availability of ultraviolet radiation in the oxygen photodissociation wavelength-regions were strong photon absorption occurs (e.g., absorption cross sections of 50 cm$^{-1}$ or higher). Initiation is possible by utilizing other photodissociation wavelength - regions but the process would then require the expenditure of considerably more energy to offset the "weak" absorption of photons. In the strong absorption regions the effective penetration of radiant energy in air at atmospheric pressure is only in the order of 0.02 centimeter. The fact that energy sufficient for photodissociation is absorbed over such a short path makes it practical to generate large local concentrations of oxygen atoms. (It has been determined that an approximate local concentration of $10^{14}$ oxygen atoms per cubic centimeter is sufficient to initiate self-sustaining combustion in fuel-oxygen-diluent mixtures of practical interest.) However, radiant energy in these strong absorption regions does not have the penetration needed to efficiently affect the combustion process beyond in the initiation zone and control the combustion rate and flame propagation speed at in-depth zones of the mixture.

FIG. 1A illustrates the advantages which may be achieved by photochemical ignition. The ordinate of the curve represents the relative minimum ignition energy which must be achieved to ignite a combustible mixture. The abscissa of the curve is the normalized air/fuel ratio (normalized with respect to the stoichiometric air/fuel ratio). It will be noted that the thermal (spark) ignition curve represents significantly higher relative minimum ignition energies than does the photochemical ignition curve. In fact, the relative minimum ignition energy in the case of photochemical ignition is almost constant, while the required thermal (spark) ignition energy increases rapidly as the normalized air/fuel ratio increases.

It will be noted from FIG. 1A that, with photochemical ignition, it is possible to utilize much higher ratios of air to fuel than heretofore possible. As is known, the use of fuel-lean combustible mixtures greatly reduces the generation of pollutants from the combustion process.

Figure 1C:
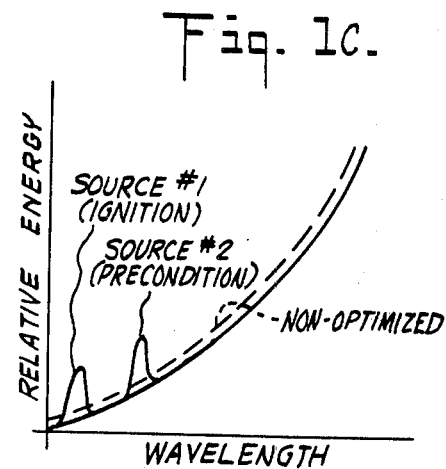
Figure 1B:
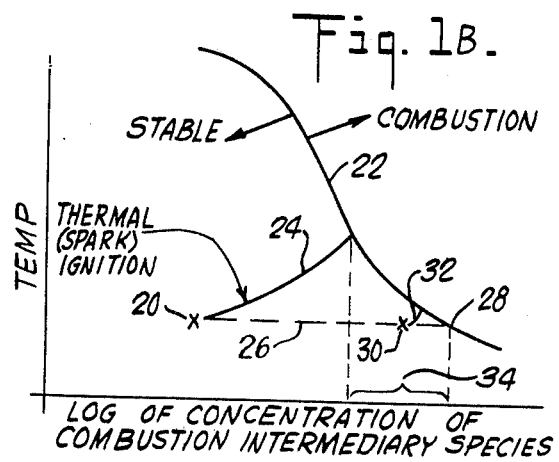
Figure 1D:
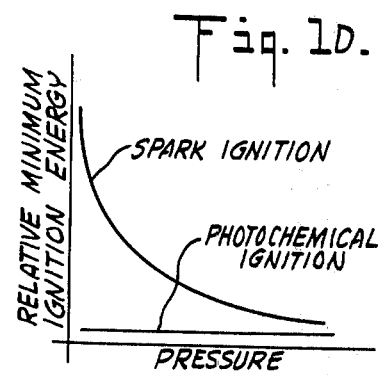

FIG. 1D illustrates the relation between relative minimum ignition energy and pressure for normal (spark) ignition and photochemically induces ignition and demonstrates that the latter can be achieved at much lower pressure than the former without the attendant severe increase in required ignition energy.

FIG. 1B illustrates the combustion enchancement that is possible through the use of photochemical ignition. The curve shown in that figure plots reactant mixture temperature (the ordinate) versus the log of concentration of combustion intermediary species (the abscissa). The point designated 20 represents the normal condition of a combustible mixture at ambient temperature. The curve 22 represents, for that mixture, the transition between a stable (non-ignited) mixture and combustion in the mixture. It will be noted that, as the concentration of a combustion intermediary species increases (e.g., the concentration of oxygen atoms in a fuel/oxygen mixture increases), the temperature at which combustion initiation takes place is reduced. The curve 24 represents the transition from the point 20 followed during thermal ignition of the mixture. The dashed curve 26, on the other hand, represents the transition in the mixture that is possible through photochemical processes. That is, as the mixture is irradiated with ultraviolet energy, the concentration of a combustion intermediary species (for example, oxygen atoms) is increased, without a concomitant temperature change. It is possible, with sufficient irradiation of ultraviolet energy, to achieve ignition. In such a case the incident ultraviolet radiation must be sufficient to achieve the concentration represented by point 28 on the curve 22. On the other hand, the incident ultraviolet radiation may be sufficient only to achieve the point designated 30 in FIG. 1B, for example. In such a case, ignition is not achieved, but the mixture is in a stable condition which is closer to ignition than it was before irradiation. Ignition may be achieved from the point 30 in one of two ways. First, further incident ultraviolet radiation may impinge upon the combustible mixture so that the mixture follows the path 26 and achieves the point 28 on the curve 22. Alternatively, the temperature of the mixture may be raised so that the mixture follows the path designated 32 in FIG. 1B. This latter effect may be achieved by a spark discharged within the mixture, for example. Ignition is achieved when the temperature is raised slightly to the value indicated by the intersection of the curves 32 and 22. It will be noted that the temperature rise from the point 30 to achieve ignition is much smaller than the temperature rise along the path 24 from the point 20.

FIG. 1B thus illustrates the enhancement of combustion that may take place by irradiating a combustible mixture with ultraviolet energy either to achieve ignition by equaling or exceeding the point 28 or enhancing the ignition process by reaching the point 30, for example. In this regard, it will be noted that, for enhancement to occur, the incident ultraviolet radiation must be sufficient to provide a concentration of combustion intermediary species (oxygen atoms, for example) within the range designated 34. This range is represented by a concentration of combustion intermediary species that is greater than the concentration existing at the thermal ignition temperature of the mixture (the thermal ignition temperature is characterized by the intersection of the curves 24 and 22) but less than the concentration required for photochemical initiation of combustion at the temperature of the mixture (this latter concentration is represented by the intersection of the curves 26 and 22). It will be appreciated that, if the radiant ultraviolet energy is only sufficient to produce a concentration of combustion intermediary species that is less than or the equivalent of that which would exist at the thermal ignition point, then a temperature increase to the thermal ignition temperature will still be required before ignition can occur. Thus, no obvious gain is achieved by irradiating the mixture with such a minimal amount of ultraviolet energy.

It has been found that the creation of a combustion intermediary species (e.g., oxygen atoms) varies throughout a fuel/oxidizer mixture, and for each zone in the mixture is dependent upon the distance of that zone from the source of ultraviolet radiation. The concentration of oxygen atoms, for example, is greatest near the source of ultraviolet energy, and decreases as the distance from the source increases. Thus, the intensity of penetrating ultraviolet radiation may be selected to create the desired number of atoms at various locations within a combustible mixture, for example, to precondition for ignition in various locations and to achieve ignition in others.

It has also been found that different wavelength regions are instrumental in creating atomic oxygen species, for example, at various distances from the source of ultraviolet radiation. Thus, the spectral radiant output of one or more radiation sources may be varied to achieve desired ignition preconditioning and ignition characteristics in a mixture. The attached Table 1 indicates, for a representative mixture, the contribution to the creation of oxygen atoms for various zones of different wavelength regions.

TABLE 1

Fractional Contribution of Indicated Wavelength Region in Oxygen Formation for Various Distances from a UV Grade Sapphire Window and a 300 Torr Stoichiometric Hydrogen-Oxygen Mixture

| wavelength region (A) | distance from window (cm) | | | | | |
|---|---|---|---|---|---|---|
| | x=0 | x=0.01 | x=0.30 | x=3.0 | x=30.0 | x=300.0 |
| 1400–1450 | 0.099 | 0.0788 | — | — | — | — |
| 1450–1500 | 0.214 | 0.181 | — | — | — | — |
| 1500–1550 | 0.241* | 0.228* | — | — | — | — |
| 1550–1600 | 0.202 | 0.216 | 0.0097 | — | — | — |
| 1600–1650 | 0.140 | 0.163 | 0.104 | — | — | — |
| 1650–1700 | 0.0698 | 0.0878 | 0.382 | — | — | — |
| 1700–1750 | 0.0316 | 0.0413 | 0.436* | 0.136 | — | — |
| 1750–1800 | 0.0026 | 0.0035 | 0.0610 | 0.734* | 0.437* | — |
| 1800–1850 | — | — | 0.0046 | 0.099 | 0.403 | 0.315* |
| 1850–1900 | — | — | — | 0.0157 | 0.0804 | 0.296 |
| 1900–1950 | — | — | — | 0.0034 | 0.0177 | 0.0842 |
| 1950–2000 | — | — | — | — | 0.0082 | 0.0403 |

TABLE 1-continued

Fractional Contribution of Indicated Wavelength Region in Oxygen Formation for Various Distances from a UV Grade Sapphire Window and a 300 Torr Stoichiometric Hydrogen-Oxygen Mixture

| wavelength region (A) | distance from window (cm) | | | | | |
|---|---|---|---|---|---|---|
| | x=0 | x=0.01 | x=0.30 | x=3.0 | x=30.0 | x=300.0 |
| 2000–2050 | — | — | — | — | 0.00720 | 0.0355 |
| 2050–2100 | — | — | — | — | 0.00738 | 0.0364 |
| 2100–2150 | — | — | — | — | 0.00755 | 0.0373 |
| 2150–2200 | — | — | — | — | 0.00737 | 0.0366 |
| 2200–2250 | — | — | — | — | 0.00705 | 0.0350 |
| 2250–2300 | — | — | — | — | 0.00613 | 0.0306 |
| 2300–2350 | — | — | — | — | 0.00485 | 0.0242 |
| 2350–2400 | — | — | — | — | 0.00352 | 0.0176 |
| 2400–2450 | — | — | — | — | 0.00228 | 0.0114 |
| Total | 1.0000 | 0.9994 | 0.9973 | 0.9881 | 0.99963 | 1.0001 |

Figure 2:
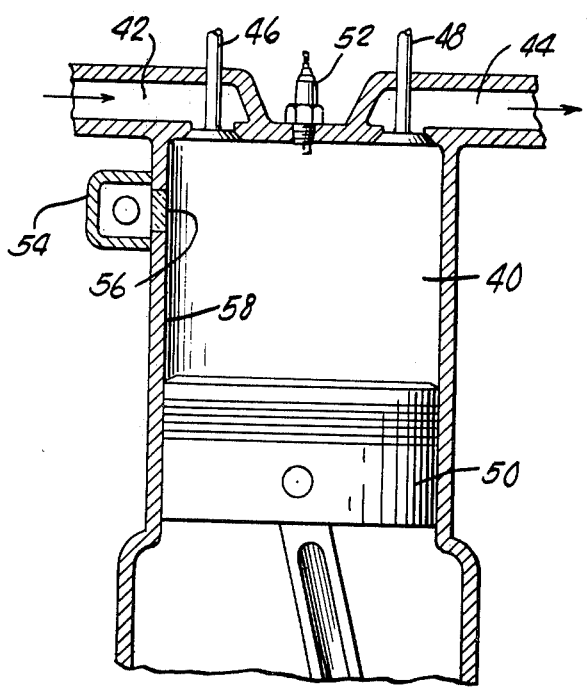
FIG. 2 is a sectional vew of a part of an internal combustion engine illustrating the invention.

The above principles find application in an automotive engine, for example, as shown in FIG. 2. A combustible mixture is supplied to combustion chamber 40 via intake manifold 42. Exhaust gases flow from the combustion chamber 40 through exhaust manifold 44. Valves 46 and 48 control the flow of gases into and out of the combustion chamber. The type of engine shown is one including a reciprocating piston 50, although this type of engine is chosen as being representative only. A conventional spark plug 52 is utilized, as well as a source 54 of ultraviolet energy. The source 54 has been shown only schematically. More detailed examples are shown in FIGS. 7 and 8, to be described later. The source 54 includes a window 56 which forms a part of the cylinder wall 58 of the combustion chamber. Ultraviolet radiation is transmitted through the window 56 into the combustible mixture within the combustion chamber 40.

In operation, the source 54 of the ultraviolet radiation conditions the combustible mixture within the combustion chamber 40 typically by providing a concentration of oxygen atoms corresponding to the point 30 in FIG. 1B. At the appropriate time in the cycle of the engine, when the piston 50 is at or near top-dead-center, a spark is generated in the mixture by the spark plug 52, causing the mixture to traverse the path 32 in FIG. 1B and thus to experience ignition and combustion of the entire mixture.

The spark plug 52 could be replaced by another source of ultraviolet radiation similar to the source 54, in which case ignition could be achieved by photochemical means entirely. In other words, operation along the curve 26 of FIG. 1B to the point 30 could be achieved by the ultraviolet source 54, and operation along the same curve from the point 30 to the point 28 could be achieved by the second ultraviolet souce replacing the spark plug 52. A single ultraviolet source (as the source 54) could be employed to achieve ignition. In any event, operation of such an engine at air/fuel ratios greater than 19 and exhaust gas recycling back into the combustion process of from 0 to 13% is achievable, resulting in fuel savings and substantial reductions of $NO_x$ emissions.

Figure 3A:
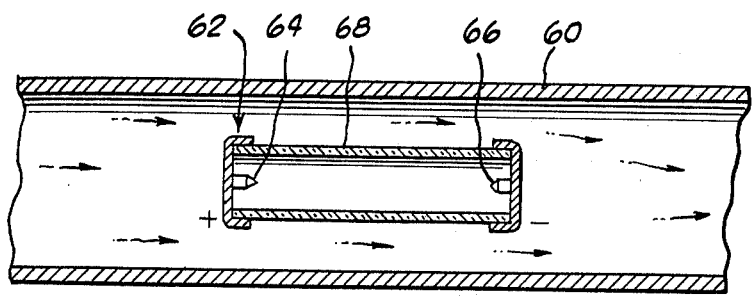
FIGS. 3A, 3B, 4 and 5 are sectional views of exhaust systems in accordance with the invention.
Figure 3B:
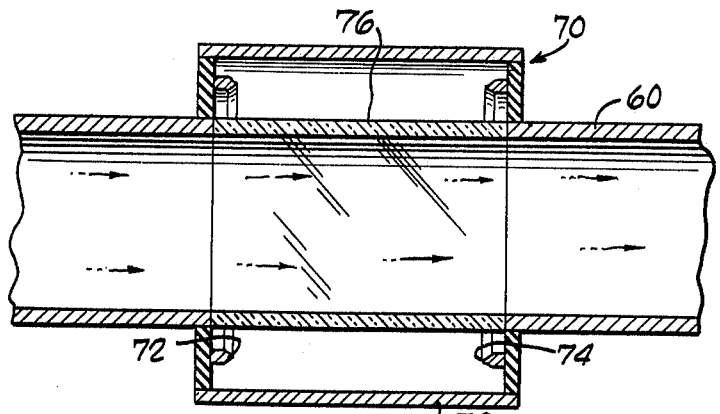

Application of the above principles to exhaust systems is shown in FIGS. 3A and 3B. In FIG. 3A, exhaust system 60 includes a source 62 of ultraviolet radiation positioned therein so that the exhaust gases flow thereabout. The source 62 may typically comprise electrodes 64 and 66 spaced from each other and positioned within a cylindrical envelope 68 which may be of sapphire or other similar ultraviolet radiation transmitting material and which is filled typically with an inert gas. A steady-state or pulsed electrical discharge between the electrodes 64 and 66 results in the generation of ultraviolet energy which is transmitted through the envelope 68 into the gaseous exhaust medium surrounding the source 62. Further completion of combustion in the exhaust gas medium is thus possible by the generation of combustion intermediary species created by the ultraviolet radiation.

In FIG. 3B, exhaust system 60 includes a source 70 in the form of annular electrodes 72 and 74 which encircle the exhaust system. In this case the wall structure of the exhaust system includes a cylindrical window 76 of ultraviolet radiation-transmitting material to transmit the radiation from the electrodes 72 and 74 into the exhaust medium. Outer envelope 78 may be of any suitable material, which may be opaque or transparent to ultraviolet radiation.

Figure 4:
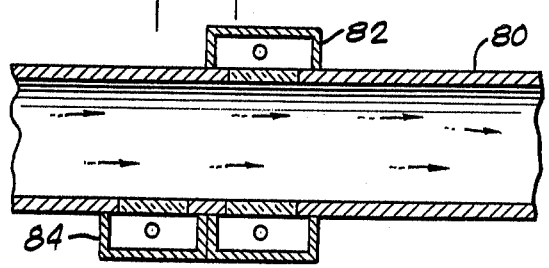

FIG. 4 shows an alternative arrangement in an exhaust system 80. Source 82 has been shown schematically, and may be the same as source 70 in FIG. 3B, for example. Source 84 is also shown schematically and may be the same as source 70 shown in FIG. 3B or may, for example, take the form of one of the sources shown in FIGS. 7 and 8 to be described in more detail below. The flow of exhaust gas is as shown by the arrows in FIG. 4, and hence it is apparent that radiation from the source 84 impinges upon and penetrates the exhaust gases first, followed by radiation from the source 82. The radiation from the source 84 may, for example, precondition the exhaust gases to a point equivalent to the point 30 in FIG. 1B. Radiation from the source 82 may then achieve combustion in the exhaust gas mixture as by causing the mixture to traverse the path between the points 30 and 28 in FIG. 1B. The sources 82 and 84 may also be operated to provide radiation at selected wavelengths, which may differ from each other, to be described in more detail below, to precondition or condition the exhaust gas mixture at various zones within the mixture, also to be described in more detail below.

Figure 5:
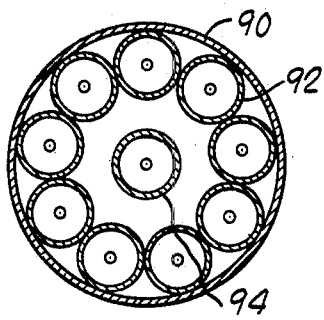

FIG. 5 shows an exhaust system 90 including a plurality of sources 92 spaced along the inside of the system, and a source 94 located along the central axis of the system. The sources 92 and 94 may take the form of the source 62 shown in FIG. 3A, for example. In any event, the sources 92 and 94 irradiate the exhaust mixture with ultraviolet energy conditioning that mixture so as to provide for combustion therein, thereby reducing and removing pollutants.

Figure 6:
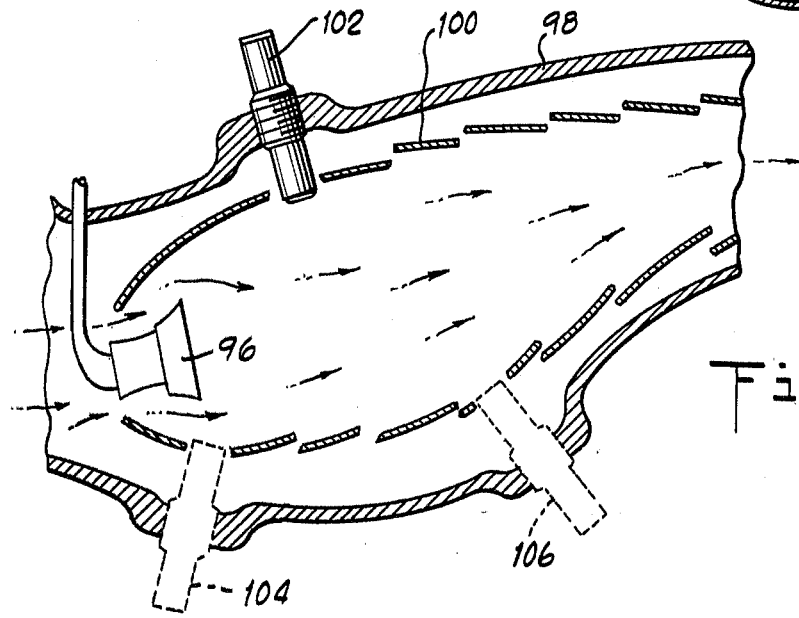
FIG. 6 is a sectional view of a part of a jet engine illustrating the invention.

FIG. 6 illustrates the application of photochemical ignition to a jet engine (typically an aircraft engine). Fuel is supplied by a fuel spray nozzle 96. Primary air is supplied which flows as shown by the arrows about the nozzle 96. Secondary and cooling air flows between outer wall 98 of the combustion chamber and inner liner 100. A source 102 of ultraviolet radiation is positioned within the wall 98 and extends into the combustion chamber through the liner 100. The source 102 may take the form, for example, of the sources shown in FIGS. 7 and 8 to be described below. A plurality of such sources may be utilized as shown by assemblies 104 and 106 drawn in dashed line. One or more of the sources 102, 104 and 106 may be ultilized to precondition the combustible mixture as well as to ignite and complete combustion therein. The sources may provide radiation of varying intensities at varying wavelengths penetrating selected zones within the mixture to enhance the combustion process, and may be timed to operate together or sequentially, for example.

FIG. 7 shows a representative source of ultraviolet radiation. The source is comprised of an annular electrode 110 which may be made of tungsten, for example. The electrode is press fitted into a tubular body 112 which may be of steel or kovar, for example. Kovar is comprised generally of 29% nickel, 17% cobalt, and 54% iron. A ring 114 (e.g., copper) may be employed to secure the press fitting of the electrode 110 to the body 112 and to provide for good electrical conduction therebetween. A cup 116 (e.g., kovar) is secured by braising or a similar procedure to the body 112. A window 118 is secured by braising or similar securing technique to the cup 116. The window 118 may be of sapphire, for example, or other suitable material for the transmission of ultraviolet energy. The outer portion of the body 112 may be threaded, as at 112a to secure the entire assembly into a wall structure in use. For example, the threaded portion 112a may be utilized to secure the source 102 within the wall structure 98 of the jet engine shown in FIG. 6 and described above.

The source shown in FIG. 7 includes an insulating liner 120 which may be of alumina or other similar insulating material. A central electrode 122 (e.g., tungsten) is included which is rod-shaped, the tip portion of which is positioned inside of and coaxially with the annular electrode 110. A cylindrical conductive member 124, which may be of molybdenum, for example, is secured to the central electrode 122. An insulating sleeve 126 (e.g., alumina) surrounds the rear portion of the conductive tube 124. A sealing piece 128 (e.g., kovar) seals the insulating sleeve 126 to the body member 112. At the right-hand end of the assembly, the conductive tube 124 has press fitted thereto a tapered pin 130 (e.g., stainless steel, copper and lead coated). A threaded connector 132 (e.g., kovar) is secured (by braising, for example) to the insulating sleeve 126 and the conductive tube 124. An end cap 134 (e.g., brass) is threaded onto the connector 132 and includes an end button 136 (e.g., tungsten brazed to cap 134) which makes electrical contact with the threaded connector 132 through cap 134. Electrical contact is thus established with the central electrode 122 by way of the conductive button 136 and with the annular electrode 110 via the body member 112.

In assembling the source shown in FIG. 7, the spaces between the electrodes 110 and 122, between the insulating insert 120 and conductive tube 124, and inside the conductive tube 124 are filled with an inert gas under pressure. Typically, the gas may be Xenon, at a pressure of 200 psia. The gas is introduced into these spaces during assembly of the source prior to the application of the sealing piece 130 and the cap-button assembly 134-136. Openings 124a in the conductive tube 124 permit the gas to flow to the interior region between the electrodes 110 and 122.

A source as just described has been employed and operated with 0.15 joule of energy in igniting a standard mixture at 300 torr (a stoichiometric mixture of two parts of hydrogen and one part of oxygen).

Sapphire has been found to be a suitable window material for transmission of ultraviolet radiation. The attached Table 2 gives the transmission characteristics of various materials. While sapphire is presently the most desirable window material, because of its hardness, scratch and chemical-attack resistance, thermal expansion coefficient, and temperature capability, other materials may suffice for various applications.

TABLE 2

Low Wavelength Cut-off of Various Far-UV Transmitting Materials

| Material | Formula | Cut-off A |
|---|---|---|
| Lithium Fluoride* | LiF | 1040 |
| Magnesium Fluoride* | $MgF_2$ | 1100 |
| Calcium Fluoride* | $CaF_2$ | 1250 |
| Strontium Fluoride* | $SrF_2$ | 1300 |
| Sodium Fluoride* | NaF | 1300 |
| Barium Fluoride* | $BaF_2$ | 1345 |
| Sapphire (UV Grade)[1] | $Al_2O_3$ | 1400 |
| Cultured Quartz[2] | $SiO_2$ | 1450 |
| Potassium Fluoride* | KF | 1600 |
| Suprasil[3] | $SiO_2$(amorphous) | 1600 |
| Lucalux[4] | $Al_2O_3$(polycrystalline) | 1700 |

Notes:
*Softening points between 400 and 600° C - water soluble and hydroscopic.
[1] Melting point 2040° C, loses some inertness at about 1700° C.
[2] Melting point 1800° C, crystal change α to β at 550° C - transmission comparable with UV grade sapphire above about 1500 A.
[3] Melting point 1800° C, devitrification starts 1000° C - transmission better than sapphire above 1680 A.
[4] Melting point 2040° C - transmission less than 20% over entire region of interest.

In many instances it is desirable to additionally transmit ultraviolet radiation of wavelengths of less than 1450 Angstroms. Since most suitable materials for the window 118 of the source of FIG. 7 absorb wavelengths below 1450 Angstroms, as is evident from Table 2 above, the source of FIG. 8 may be useful in supplying such wavelengths of energy. The source is similar in features and materials to that shown in FIG. 7, except that it completely lacks a window. The source includes a central electrode 140 attached to tubular member 142 which extends rearwardly (to the right). The tube 142, which is conductive, is surrounded by a nonconductive sleeve 144. The sleeve 144 and tube 142 terminate in a threaded member 146 which includes gas ports 146a therein. A retaining piece 147 (e.g., kovar) is attached to the insulating member 144. An annular electrode 148 is included at the left-hand end of the assembly and held by a threaded cap 150 which is threaded onto threaded end portion of body member 152. It will be noted that the central electrode 140 is coaxial with the annular electrode; however, the tip portion of the central electrode is not within the annular electrode but is spaced to the rear (to the right) thereof. An insulating sleeve 154 is secured to the inside of the body member 152. The right-hand end of the body member 152 is threaded and receives a gas supply and electrical coupling adapter member 156. The member 156 includes a gas inlet 158 through which gas flows as shown by the arrows in FIG. 8. An insulating sleeve 160 is secured to the inside of the gas supply member 156. Inside the insulating sleeve 160 is an insert 162 (nylon, for example). End cap 164 and end button 166 are similar to the like components 134 and 136 in FIG. 7. An O-ring 168 is included for sealing purposes.

Gas flows as shown by the arrows through the inlet 158 and thence into the interior of the conductive tube 142, passing outwardly through openings 142a thereof and past the central electrode 140 and through the opening in the annular electrode 148. This gas which flows, typically argon, passes into the combustion chamber with which the ultaviolet source is associated at a pressure about the same as that within the chamber. The gas passing into the combustion chamber does not adversely affect the combustion process; however, it has the advantage of isolating the electrodes 140 and 148 from the combustion process while at the same time transmitting the desired wavelengths of energy below about 1450 Angstroms.

FIG. 9 shows an electrical circuit used for energizing the ultraviolet source of FIG. 7. Power source 180 generates a DC potential which energizes capacitor 182 which stores a charge thereon. Normally the ultraviolet source 184 is non-conductive. It is rendered conductive by the application of a suitable ionizing potential from a trigger transformer 186. The transformer receives a signal from trigger and timing circuitry 188 which may be an automotive timing distributor, for example, or a timed circuit set to provide a signal at a given repetition rate, suitable for aircraft ignition, for example. Whenever a suitable ionizing potential is developed by the transformer 186, the source 184 is ionized rendering it conductive, permitting the capacitor 182 to discharge through the source. The discharge of the capacitor results in a "flashing" of the source, generating light output in the ultraviolet spectrum.

The circuitry of FIG. 10 is suitable for energizing a windowless source of the type shown in FIG. 8. The circuit of FIG. 10 is the same as that of FIG. 9, except in this case a trigger control gap 190 is employed. This gap serves the function of providing a constant, high voltage block which prevents the capacitor 182 from discharging into the ignition source 184' until a signal is received from the trigger transformer 186. This is necessary when a windowless source is used since the source pressure and hence the source breakdown characteristics will vary as the ambient pressure to which it is exposed is varied, thus resulting is erratic or incorrect operation. Major losses will occur in transferring energy from the capacitor 182 to the ultraviolet source 184' through the trigger gap 190. This loss or inefficiency is avoided by the normal, hermetically sealed source of FIG. 7. Typically, 50% of the energy transferred from the capacitor could be lost in the trigger gap 190. However, such a gap is required when the ultraviolet source utilizes an opening, as in FIG. 8, without any solid barrier isolating the electrodes from the combustion environment.

The following examples will illustrate and further explain the invention.

EXAMPLE 1

A stoichiometric hydrogen-oxygen mixture ($2H_2+O_2$) is utilized at a pressure of 300 torr and temperature of 300° K (27° C). The mixture either has zero velocity (stationary) or is flowing at a velocity less than about 250 cm/sec. Before ignition and burning occurs, approximately $3.24 \times 10^{18}$ oxygen molecules/cm$^3$ and $4.91 \times 10^{-22}$ oxygen atoms/cm$^3$ will be present at ambient temperature.

Normal thermal ignition would require a mixture temperature increase of 553° K to a temperature of about 853° K at which point approximately $2.18 \times 10^6$ oxygen atoms/cm$^3$ would be present.

An ultraviolet source is used to precondition the mixture before an ignition source is applied. This source is of the type shown in FIG. 7 and has the characteristics: sapphire window, window aperture of ¼ diameter and radiant power flux in the vacuum ultraviolet of 10 microwatts/cm$^2$ A at about 1500 A impinging on the window — in the steady operating mode. Steady oxygen atom concentrations of about $2.78 \times 10^{13}$ oxygen atoms/cm$^3$ are developed at the ignition site (near the source) prior to the application of an ignition pulse, while at a reasonable distance into the mixture away from the source, say 5cm, steady oxygen atom concentrations of about $4.72 \times 10^{10}$ oxygen atoms/cm$^3$ are developed prior to initiation of burning. These values are achieved in about 2.5 milliseconds after turn-on (initiation of operation).

A superimposed spark discharge initiates combustion; however, the ignition kernel is initiated with a temperature increase to only 395° K instead of the usually needed 853° K. Further, at a point 5cm away from the window combustion begins when only a 563° K temperature is reached instead of the usual 853° K. Alteration of the radiant power of the source results in control of the initiation and burning requirement within the ignition kernel and at in-depth (away from the window) locations of the mixture.

For an ultraviolet source of the type shown in FIG. 7 being run steady state, if it is assumed that the conversion efficiency of stored energy into ultraviolet light for the steady operating mode in one tenth that for the pulsed operating mode, then the source output power flux in the ultraviolet for this example represents a required input power of about 86.8 watts.

EXAMPLE 2

The same conditions as in Example 1 apply, except that the ignition source is provided by superimposing an ultraviolet flash. This flash is generated by the same source used to provide the continuous or steady, low level ultraviolet flux — although a second, separate radiant source could be employed as well. The output characteristics of the photochemical source are as follows: steady state ultraviolet energy of about 10 microwatts/cm$^2$ A; superimposed flash of an additional 1690 microwatts/cm$^2$ A for about 100 microseconds.

After the short duration, high power flash, the oxygen atom concentration near the source rises to about $8.42 \times 10^{14}$ atoms/cm$^3$ which exceeds the critical concentration for ignition without the need for an attendent temperature rise, thus initiating combustion.

At a point 5cm into the mixture measured (from the window) the oxygen atom concentration rises to about $1.43 \times 10^{12}$ atoms/cm$^3$. Consequently, combustion begins at this point when only a 475° K temperature is reached instead of the usual 853° K.

For a source of the type shown in FIG. 7, the superimposed radiant pulse represent an input energy dump of only about 150 millijoules.

EXAMPLE 3

The same conditions and results as in example 2 apply, except that sequential pulsing is employed as follows: steady state ultraviolet energy to precondition the mixture is provided by a series of discrete pulses of energy about 20 microwatts/cm$^2$ A, each of a duration of about 250 microseconds spaced from each other by about 250 microseconds. The series lasts for a period of about 2.5 milliseconds (about 5 discrete pulses) followed in about 250 microseconds by a flash (pulse) of ultaviolet energy of about 1700 microwatts/cm$^2$ A lasting for about 100 microseconds to initiate combustion in the preconditioned mixture. Alternatively, the last-mentioned ultraviolet pulse is replaced by a spark pulse to achieve ignition in the preconditioned mixture.

For a source of the type shown in FIG. 7, each of the 5 low level ultraviolet pulses represents input dumps of only about 4.35 millijoules per pulse. This is followed by a 150 millijoule final-ignition ultraviolet pulse.

EXAMPLE 4

The same conditions apply as in Example 1, except that the ultraviolet source is replaced by two separate ultraviolet sources both at approximately the same location. Each of the sources is optimized to a particular wavelength region as follows: Source No. 1 is optimized in the 1500 A to 1550 A region (ignition) such that 5% of the total energy which was originally spread over the ultraviolet region of interest is now concentrated in the 1500 A to 1550 A region — see FIG. 1C. Source No. 2 is optimized in the 1750 – 1800 A region (in-depth combustion enhancement) in the same manner — see FIG. 1C. In FIG. 1C, the dashed curve represents a non-optimized source. The area between the non-optimized and optimized curves represents the energy shifted into the optimized region. Optimization of a source of the type shown in FIG. 7 is achieved by varying gas pressure, gas type, electrode spacing and configuration, for example.

Before optimization, the original non-optimized source required about 150 millijoules input energy for ignition (creation of $8.29 \times 10^{14}$ atoms/cm$^3$ near the window). This also resulted in in-depth combustion enhancement, for example — at 5cm into the mixture, about $1.41 \times 10^{12}$ atoms/cm$^3$ were created, resulting in the lowering of the ignition temperature from about 853° K to about 475° K. The same ignition and enhancement effects are achieved by pulsing both of the optimized sources instead of a single non-optimized source. Identical effects are obtained by pulsing source No. 1 at 38 millijoules and source No. 2 at 33 millijoules. Thus the total pulse energy required is reduced from 150 millijoules to about 71 millijoules.

If only optimized source No. 1 were used, ignition would be achieved with the expenditure of only about 48 millijoules (instead of the 71 millijoules noted above). However, the enhancement effect would be reduced, with only about $4.28 \times 10^{11}$ oxygen atoms/cm$^3$ being created at a depth of 5cm. This results in lowering the ignition temperature from 853° K (without enhancement) to about 515° K. Thus the equivalent of 40° K enhancement effect is lost compared to the above example but a savings in input energy of about 32% is realized.

EXAMPLE 5

The same conditions as in example 1 apply, except that combustion is initiated at one end of a tubular chamber 5cm in diameter and also the combustion process is affected at a distance 5cm away from the ignition site on the center line of the chamber. These requirements are met by using two sources: Source No. 1 is located near the ignition site on the axis of the tubular chamber, and is optimized in the 1500 – 1550 A region for ignition as per the previous example. Source No. 2 is located 5cm away from the ignition site in the side wall of the chamber. This locates it 2.5cm away from the desired enhancement area. Source No. 2 is optimized in the 1750 – 1800 A region as per the previous example.

Ignition is achieved by pulsing source No. 1 at a 48 millijoule input level (assuming typical efficiencies of the source of the type shown in FIG. 7). When the in-depth enhancement goal at the 5cm distance is a reduction of ignition temperature from the normal 853° K to 475° K, source No. 2 is supplied at a pulse energy level of only about 9.5 millijoules. Thus the total energy consumed is only about 57.5 millijoules compared with 71.0 millijoules if both sources were at the ignition site as in example 4.

EXAMPLE 6

The same conditions as in example 2 apply, except that two sources are used. One source provides a steady or quasi-steady (duration times of about 2 to 3 milliseconds) radiant flux of about 10 microwatts/cm$^2$ A. The second source is sequenced to pulse after time periods equal to or greater than 2 to 3 milliseconds and provides about 1700 microwatts/cm$^2$ A.

Each source may be tuned for a particular wavelength distribution.

SUMMARY

The present method depends on controlling the density of a combustion intermediary species (e.g. oxygen atoms) in various parts of the volume occupied by a fuel/oxidizer mixture. This is accomplished by causing ultraviolet irradiation to impinge on the mixture causing direct photodissociation of oxygen molecules into oxygen atoms, for example.

Photodissociation of oxygen molecules in wavelength regions where weak photon absorption occurs [for example, in the Schumann-Runge band system (1750 – 2000 A) or the Herzberg band system (2000–2424 A)] results in penetration of radiant energy in air at atmospheric pressure up to several meters or more. As a result, these weaker untraviolet radiation absorption regions may be used to control the combustion rate and flame propagation speed by dissociating a number of oxygen molecules within a fuel-oxygen-diluent mixture, thus creating oxygen atoms that are present when the combustion process engulfs an in-depth volume of the reactant mixture. The number of oxygen atoms created in this manner prior to the arrival of a flame front can be sufficient for controlling the rate of combustion and flame front propagation speed, but not necessarily sufficient to produce initiation of combustion throughout the volume of the fuel-oxygen-diluent mixture.

An ultraviolet radiation source (or sources) is used to provide ultraviolet radiation in regions desired. Radiation in various regions of interest can be generated simultaneously or timed at intervals. The weak penetration-strong absorption regions are primarily used in initiating the self-sustaining combustion process. The strong penetration-weak absorption regions are primarily used in controlling combustion processes. It is clear that by controlling the intensity in the photochemical enhancement regions as well as the timing of irradiation relative to the initiation of combustion, photochemical initiation and control of initiation of the combustion process, as well as control of the combustion rate and flame propagation speed, can be obtained.

Although the primary mechanism for initiation and control of combustion is the photodissociation of oxygen molecules into two oxygen atoms, it should be noted that during the irradiation process other species may be formed within the same volume of the fuel-oxygen-diluent mixture. Such species could be excited oxygen molecules, excited molecules and atoms of the fuel or the diluent, or the intermediary species produced by the ensuing reactions. The presence of each species constitutes the creation of a combustion intermediary species.

The techniques described in the present application may be used to eliminate or reduce some or all of the various limitations inherent in other combustion initiation processes mentioned above (e.g., spark), as well as to provide for the control of the rate of combustion and the speed of the propagation of the flame that is generated. Photochemical initiation of combustion control of initiation of combustion and control of combustion by means of irradiation by selected ultraviolet radiation can be used effectively over a wide range of pressure, temperature, flow conditions, turbulence, fuel type and stoichiometry. Furthermore, the techniques can be used to reduce the delays in the combustion initiation process and enhance mixing fuel-oxygen-diluent reactant mixtures and control combustion instabilities.

It will be evident that many different techniques as outlined above are possible. For example, a continuous, pulsed or modulated power supply may be utilized, enabling the ultraviolet radiation source to operate in various modes such as: a single flash of appropriate duration; the source being on continuously at a level of intensity sufficient to precondition the fuel-oxygen-diluent mixture in depth, and then a flash superimposed to initiate combustion; sequential flashes of appropriate interval and duration; a source continuously on and capable of initiation of combustion. Furthermore, there may be more than one ultraviolet radiation source, such as: a number of ultraviolet sources, each tuned or optimized to a separate wavelength region of radiation; a number of ultraviolet sources directed to irradiate various parts of a fuel/oxidizer mixture with variation in spectral distribution and intensity of the radiant output; a number of ultraviolet sources used in sequence or phased according to a preselected timing sequence that provides varying intensities and spectral distributions of ultraviolet radiation to the reactant mixture at varying times.

There may also be varied geometric relationship between a radiation source and a combustion chamber, such as one source to one chamber, one source for many chambers, one chamber with many sources.

An important realization of the present invention is that increasing the input energy results in a pronounced effect on the reaction front propagation velocity. For example, a stoichiometric hydrogen-oxygen mixture at 300 torr pressure and room temperature was exposed to radiant energy levels which resulted from 200 to 300 joule energy inputs. The reaction front arrival time at photo-cells positioned at 7.52 cm and 12.52 cm from the radiant source window (ultraviolet grade sapphire) was interpreted to demonstrate that an increase in input energy by a factor of 10 results in reducing the reaction front arrival time approximately 50%. It is expected that a similar reduction in ignition delay can be brought about by increasing the input energy. The proposal that enhancement in depth is created by the generation of oxygen atoms is thus supported since, in the region discussed, ten times the normal oxygen atom concentration is generated for ten times the amount of energy. Increasing the input energy results in an increase in reaction front propagation velocity.

It should be noted that there are no presently known window materials that transmit photons below 1000 A (lithium fluoride windows transmit radiation down to about 1040 A). As a result, if radiation below the LiF ultraviolet cut-off wavelength is desired, the operation of an ultraviolet source has to be windowless by necessity. Operation in this mode is as discussed in connection with FIG. 8, and provides lower wavelength radiation than that normally available from sealed radiant sources. This results in additional contributions to the important oxygen photodissociative reactions, above that normally possible when sources with windows are used. Further, windowless operation avoids the potential problem of window transmission loss due to contamination, either internal or external. In terms of practical industrial materials available, sapphire (which transmits radiant energy down to about 1430 A) and special quartz (which transmits radiant energy down to about 1550 A) provide the lowest usable wavelengths. Sapphire is preferable to quartz because of its lower ultraviolet cut-off limit. Lower wavelength transmitting windows (such as lithium fluoride) do not have the necessary structural strength, have high temperature limitations, and are hydroscopic; all of these features being undesirable in most practical situations.

An important aspect of the present invention relates to the use of photochemical ignition and combustion control within the combustion chamber of an internal combustion device for the purpose of reducing or eliminating engine exhaust pollutants, particularly nitric oxides. Pollution control is achieved by taking advantage of the different combustion characteristics that are possible with the photochemical method compared to the spark method. Direct control within the combustion chamber is accomplished by either initiating a rapid combustion front or ignition of fuel-lean mixtures.

Experiments have indicated that acceptable pollution controls, particularly of nitric oxides, can be achieved by providing for reliable and positive ignition and combustion of the appropriate fuel-lean mixtures, with or without exhaust gas recycle. However, ignition of fuel-air mixtures by means of spark sources becomes increasingly difficult and eventually impossible when the reactant mixture is made progressively more fuel-lean. Photochemical ignition and combustion control of reactant mixtures does not experience the same difficulties.

A comparison between the two methods, shown in FIG. 1A, illustrates the vastly different characteristics that can be obtained by using the photochemical technique. Energy requirements for spark ignition of fuel-lean mixtures increase drastically compared to energy requirements for photochemical ignition as the mixture is made leaner.

The increased ignition capability may be used to successfully operate internal combustion engines at conditions which currently represent regions of poor combustion. This would then provide for operation at greatly reduced $NO_x$ levels, either with or without exhaust gas recycle.

In operation, the spark plug and its associated electronics is replaced by a photochemical ignition source with its electronics, or if not replaced then accompanied by a photochemical ignition source. The engine is tuned to run fuel-lean with or without exhaust gas recycle.

A second aspect of pollution control within the combustion chamber is based on the finding that nitric oxide is formed in significant concentrations only in the postflame reactions following passage of a flame front. That is, it forms at an insignificant rate at temperatures encountered through the flame front, and only begins to proceed at a rapid rate at the high temperatures characteristic of the combustion products. Thus, it is possible to describe the formation time of nitric oxide at the combustion products temperature by a characteristic time, $\tau_{no}$.

Since $\tau_{no}$ is determined by gas-phase chemical kinetics, and thus is a strong function of combustion product temperature (as is the equilibrium nitric oxide concentration), it is susceptible to control through variation of fuel-air ratio (as is the equilibrium nitric oxide concentration).

For example, changing the fuel-air ratio from a fuel-rich to a fuel-lean condition (say equivalence ratio 1.2 to 0.9) results in an increase in $\tau_{no}$ from a few msec to approximately 10 msec in gasoline-fueled automotive engines.

An important aspect of the photochemical control technique is that ignition and flame propagation are affected using the photochemical ignition process as opposed to spark ignition. For example, photochemical ignition of a methane-air mixture can be made to occur at room temperature in times much less than the time involved in spark ignition and the ensuing propagating reaction front is stronger even without motion in the unburned gas. On the other hand, electric spark (thermal) ignition requires first a large temperature rise above room temperature, and propagates a weaker reaction front for similar conditions.

In practice, substitution of a photochemical ignition source for a spark-ignition source should reduce the time required for combustion of the fuel charge. This permits retardation of ignition until the piston is close to top dead center or to the power stroke. Fuel energy release will be initiated and controlled photochemically and combustion products will be generated during a small piston excursion from top dead center, so that engine efficiency will be essentially unaltered. However, since the combustion can be timed to occur near or at the start of the power stroke, significant expansion will take place before very much nitric oxide can be produced.

Still another application of the method of photochemical initiation and control of combustion within the combustion chamber of an engine is to provide for operation of engines outside their normal limits. For example, the design of aircraft combustors are limited by the requirements of spark ignition and normal combustion characteristics. Photochemical ignition permits operation of conditions not normally possible, thus extending the possible design range.

Yet another application of the method of photochemical initiation and control of combustion is to provide for the treatment of engine or chemical process exhaust gas products. For example, the three main pollutants from engine emissions are unburned hydrocarbons, carbon monoxide and oxides of nitrogen. They result as a consequence of the inability of the combusting hydrocarbon-air mixture to maintain equilibrium burning rates during the expansion process in the combustion chamber. Further combustion and burning of these species by photochemically catalyzing combustion reactions within the exhaust manifold of the machine is possible due to the enhanced combustion characteristics provided by the photochemical method.

The invention, described above, is to be defined by the following claims.

What is claimed is:

1. In a method of controlling the initiation of combustion and controlling combustion within an internal combustion engine supplied with a combustible fuel-air mixture, the step comprising irradiating the mixture with ultraviolet energy in the region below about 2450 A and of sufficient intensity to initiate combustion at a temperature below the thermal ignition temperature of the mixture, in which the engine is an aircraft engine.

2. Apparatus for controlling the initiation of combustion and controlling combustion in a combustible mixture, comprising a combustion chamber for receiving said combustible mixture, and a plurality of sources of ultraviolet energy positioned to irradiate the mixture within said chamber with ultraviolet energy, in which said combustion chamber is in an aircraft engine.

* * * * *